(12) United States Patent
Niu et al.

(10) Patent No.: US 8,773,399 B2
(45) Date of Patent: Jul. 8, 2014

(54) TOUCH DISPLAY DEVICE

(75) Inventors: Tzu-Ling Niu, Hsin-Chu (TW); Fu-Cheng Fan, Hsin-Chu (TW)

(73) Assignee: AU Optronics Corp., Hsinchu (TW)

( * ) Notice: Subject to any disclaimer, the term of this patent is extended or adjusted under 35 U.S.C. 154(b) by 119 days.

(21) Appl. No.: 13/592,343

(22) Filed: Aug. 23, 2012

(65) Prior Publication Data

US 2013/0257810 A1 Oct. 3, 2013

(30) Foreign Application Priority Data

Mar. 28, 2012 (TW) .............................. 101110858 A

(51) Int. Cl.
*G09G 5/00* (2006.01)

(52) U.S. Cl.
USPC ........... 345/175; 345/173; 345/174; 345/176; 345/178; 345/179; 178/18.01

(58) Field of Classification Search
USPC ................................................ 345/175, 102
See application file for complete search history.

(56) References Cited

U.S. PATENT DOCUMENTS

| | | | | |
|---|---|---|---|---|
| 2004/0140960 A1* | 7/2004 | Cok | ............................... | 345/175 |
| 2008/0278460 A1* | 11/2008 | Arnett et al. | .................. | 345/175 |
| 2011/0291993 A1* | 12/2011 | Miyazaki et al. | ............. | 345/175 |
| 2012/0133598 A1 | 5/2012 | Fan | | |

FOREIGN PATENT DOCUMENTS

| | | |
|---|---|---|
| JP | 11045155 | 2/1999 |
| TW | 460737 | 10/2001 |
| TW | 200405088 | 4/2004 |

* cited by examiner

*Primary Examiner* — Grant Sitta
(74) *Attorney, Agent, or Firm* — Ding Yu Tan

(57) ABSTRACT

A touch display device includes a display panel, a touch panel, a plurality of first light sources, a plurality of light sensors and at least one second light source. The display panel has a display surface. The touch panel is disposed above the display panel and includes a transparent part, a plurality of light guide parts configured to protrude from the surface of the transparent part thereby corporately forming a touch region on the surface. The first light sources and first light source is reflected by the light guide parts so as to emit above the touch region and be received by the light sensors. The second light source is configured to emit visible light beams, which is emitted out via the touch panel.

15 Claims, 11 Drawing Sheets

TOUCH DISPLAY DEVICE

TECHNICAL FIELD

The present disclosure relates to a display device, and more particularly to a touch display device.

BACKGROUND

With the advances of technology, touch display device has been widely used in various electronic devices. Basically, the touch display devices can be categorized into the following: resistive, capacitive, optical, acoustic wave and electromagnetic types. The optical touch display device is configured to have its touch panel disposed on a display panel and thereby, through disposing a plurality of infrared light sources, each of which is configured to emit infrared light beams, forming a light grid on the surface of the touch panel. In addition, the optical touch display device is further provided with a plurality of light sensors, corresponding to the infrared light sources, configured to sense the infrared light beams. According to this specific structure for the optical touch display device, a portion of the light grid may be blocked and accordingly the light or illumination intensity of the infrared light beams may result in light intensity variations while the surface of the touch panel is being touched by an object; and consequently, the optical touch display device can determine the touch point of the object on the touch panel according to the variations of the infrared light beams sensed by the light sensors.

Due to being capable of being controlled via a user's finger or a touch pen, the optical touch display device gradually is used in some compact electronic apparatuses. Therefore, developing an optical touch display device having a smaller size and a lighter weight is an important issue to those ordinarily skilled in the art.

SUMMARY

One object of the present disclosure is to provide a touch display device having a compact size and thereby being capable of being used in a compact apparatus.

The disclosure provides a touch display device, which includes a display panel, a touch panel, a plurality of first light sources, a plurality of light sensors and at least one second light source. The display panel has a display surface. The touch panel is disposed above the display panel and includes a transparent part, a plurality of first light guide parts and a plurality of second light guide parts. The transparent part has a first surface, a second surface and at least one side surface. The first surface and the second surface are opposite to each other, the second surface is configured to face the display surface, the at least one side surface is connected between the first surface and the second surface. The first light guide parts and the second light guide parts are configured to protrude from the first surface and disposed at four sides of the transparent part and thereby corporately forming a touch region on the first surface. Each first light guide part is opposite to one second light guide part. Each first light guide part has a first reflective surface. Each second light guide part has a second reflective surface. The first reflective surfaces and the second reflective surfaces each are configured to face the touch region.

In addition, the first light sources are disposed under the touch panel and corresponding to the first light guide parts and each are configured to emit invisible light beams. The invisible light beams are emitted into the touch panel through the second surface. The first surfaces each are configured to reflect the invisible light beams thereby reflecting the invisible light beams sequentially above the touch region and to the corresponding second reflective surface. The light sensors are disposed under the touch panel and corresponding to the second light guide parts and each are configured to receive the invisible light beams reflected by the corresponding second reflective surfaces. The at least one second light source is disposed beside the at least one side surface and configured to emit visible light beams. The visible light beams are emitted into the touch panel through the at least one side surface.

In summary, the touch display device according to the present disclosure adopts a touch panel with light guide parts. And thus, the invisible light beams emitted from the first light source can be directed to the corresponding light sensors by the light guide parts; in addition, a light net, configured for determining whether or not the touch panel being touched by an object, can be formed above a touch region on the touch panel. Moreover, the touch display device according to the present disclosure further includes a second light source, which can be guided by the touch panel with light guide parts; and thus, the touch display device according to the present disclosure can use less number of elements and accordingly have a smaller size.

BRIEF DESCRIPTION OF THE DRAWINGS

The present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1A:
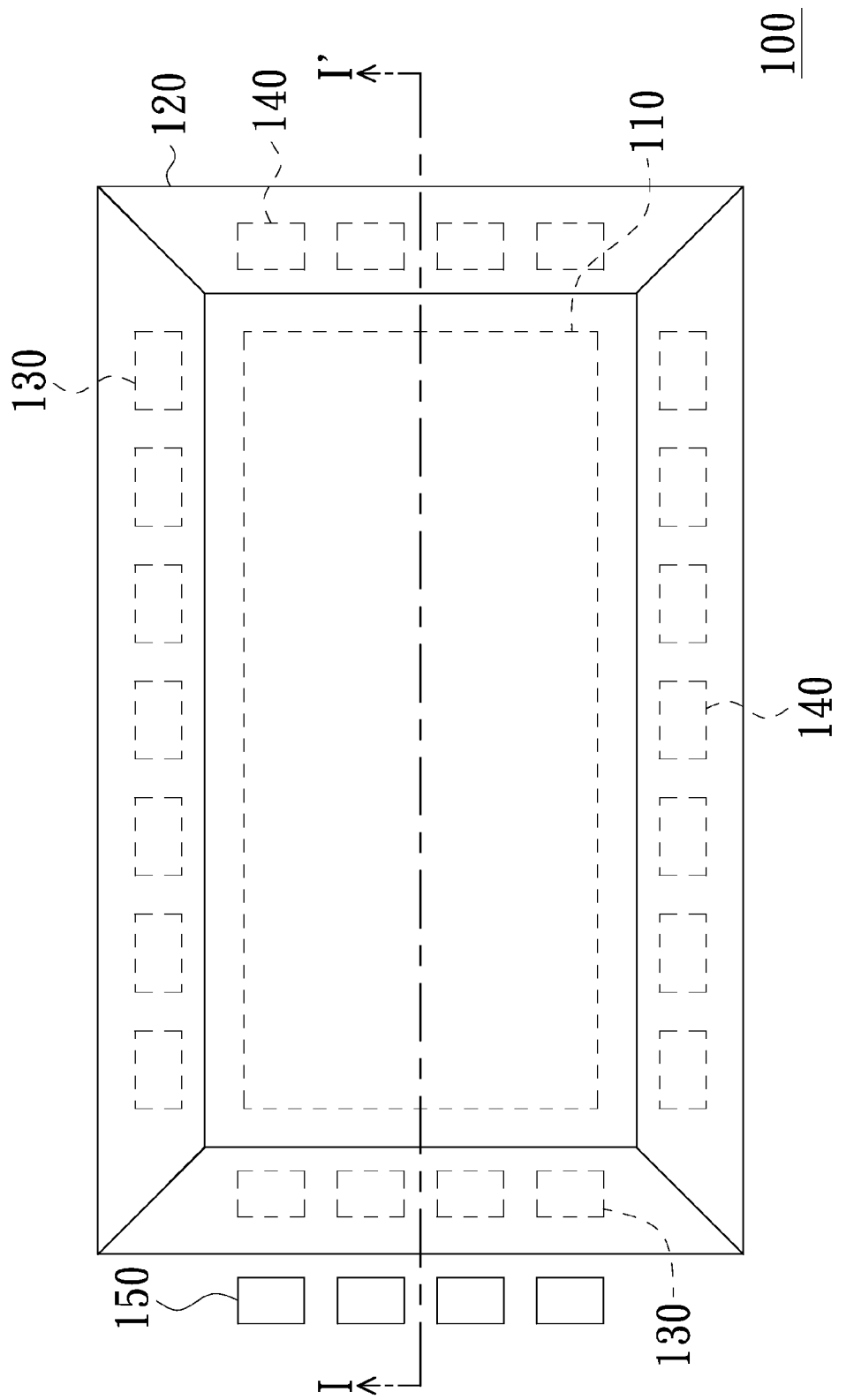
FIG. 1A is a schematic front view of a touch display device in accordance with an embodiment of the present disclosure.
Figure 1B:
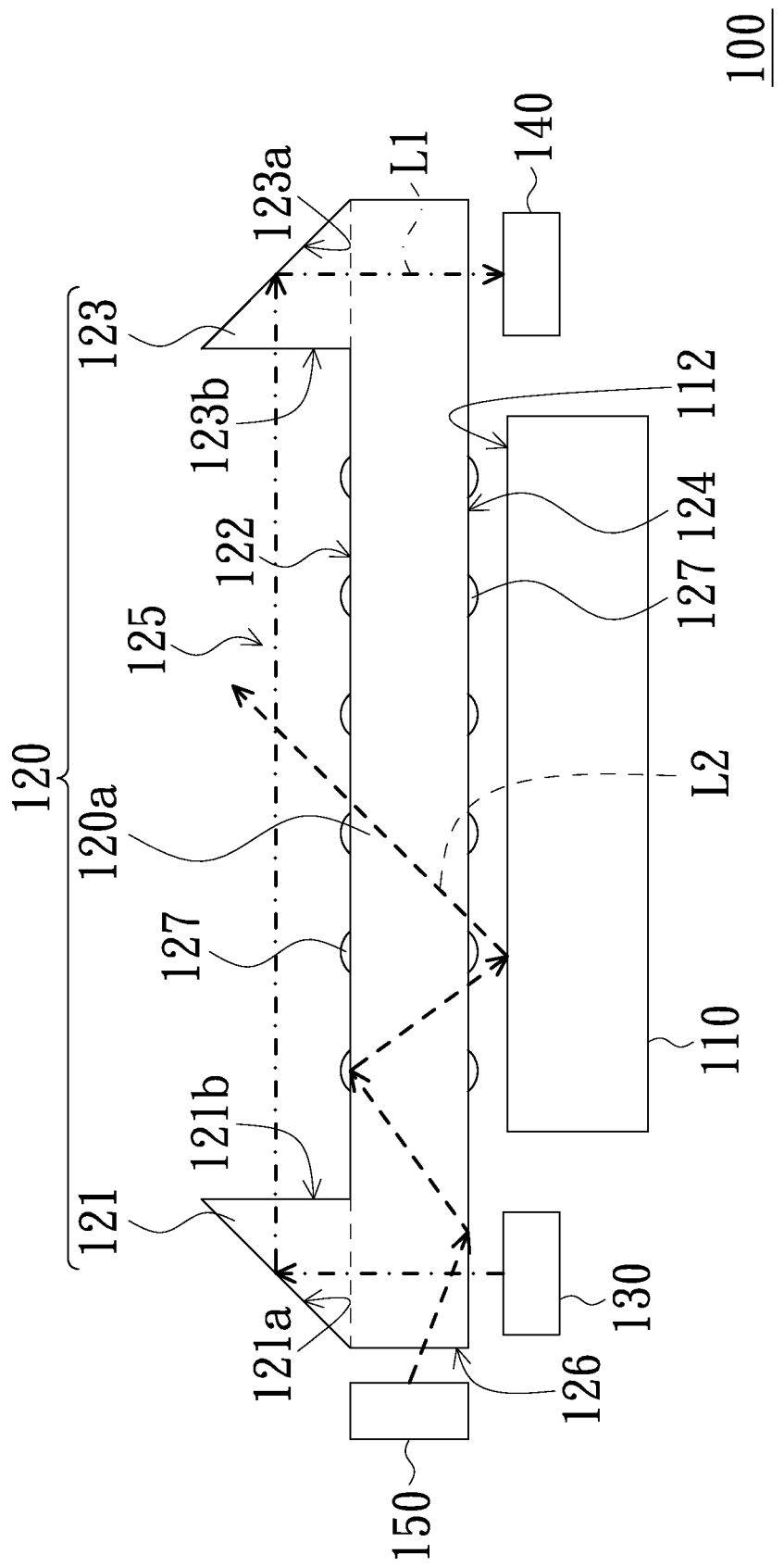
FIG. 1B is a schematic cross-sectional view of the touch display device in FIG. 1A along a line I-I'.

FIG. 1A is a schematic front view of a touch display device in accordance with an embodiment of the present disclosure; and FIG. 1B is a schematic cross-sectional view of the touch display device in FIG. 1A along a line I-I'. Please refer to FIGS. 1A, 1B both. The touch display device 100 in this embodiment includes a display panel 110, a touch panel 120, a plurality of first light sources 130, a plurality of light sensors 140 and at least one second light source 150; wherein the display panel 110 has a display surface 112, and above which the touch panel 120 is disposed. In this embodiment, the display panel 110 and the touch panel 120 are configured to have a medium (for example, air) therebetween, and no limitation. In another embodiment, the medium between the display panel 110 and the touch panel 120 can be optical clear adhesive (OCA) or hydrogel for the bonding of the display panel 110 and the touch panel 120.

Moreover, the touch panel 120 includes a transparent part 120a, a plurality of first light guide parts 121 and a plurality of second light guide parts 123. In this embodiment, the transparent part 120a, the first light guide parts 121 and the second light guide parts 123 corporately have a one-piece structure which may be manufactured by an injection molding mean, and no limitation. In another embodiment, the first light guide parts 121 and the second light guide parts 123 can be individually fixed to the transparent part 120a through an optical bonding mean. In addition, the material of the transparent part 120a is capable of being penetrated through by both visible light beams and invisible light beams; and the material of the first light guide part 121 and the second light-guide part 123 is capable of being penetrated through by invisible light beams only and cannot be penetrated through by visible light beams.

The transparent part 120a has a first surface 122, a second surface 124 and a side surface 126. Specifically, the second surface 124 is configured to face the display surface 112 of the display panel 110; the first surface 122 and the second surface 124 are opposite to each other, and the side surface 126 is connected between the first surface 122 and the second surface 124. The first light guide parts 121 and the second light guide parts 123 are configured to protrude from the first surface 122 and disposed at the four sides of the transparent part 120a, and thereby defining a touch region on the first surface 122. Specifically, each two opposite sides of the transparent part 120a are respectively disposed with one first light guide part 121 and one second light guide part 123. For example, the touch panel 120 includes two first light guide parts 121 and two second light guide parts 123; wherein the two first light guide parts 121 are respectively disposed at two adjacent sides of the transparent part 120a, the two second light guide parts 123 are respectively disposed at another two adjacent sides of the transparent part 120a, and accordingly each first light guide part 121 is opposite to one second light guide part 123. Furthermore, the first light guide parts 121 each have a first reflective surface 121a, and the second light guide parts 123 each have a second reflective surface 123a; wherein these first reflective surfaces 121a and these second reflective surfaces 123a each are configured to face the touch region 125. Moreover, the first reflective surfaces 121a and the second reflective surfaces 123a each are coated with material capable of reflecting invisible light beams.

The first light sources 130 are disposed under the touch panel 120 and corresponding to the first light guide parts 121. In this embodiment, the first light guide parts 121 each are disposed with a plurality of first light sources 130 thereunder. Specifically, the first light sources 130 each are an infrared light source which is configured to emit invisible light beams L1 toward the touch panel 120. In particular, the first light source 130 can be an infrared laser light source, so the invisible light beams L1 can have a higher collimation. Or, the first light source 130 can be provided with a collimation lens (not shown) at the light-emission end thereof; and thus, the invisible light beams L1, after being emitted from the first light source 130, will be firstly emitted through the collimation lens before being emitted into the touch panel 120. Based on the aforementioned configurations, the invisible light beams L1 are guaranteed to have a higher collimation before being emitted into the touch panel 120.

After being emitted from the first light source 130, the invisible light beams L1 are sequentially emitted into the internal of the touch panel 120 through the second surface 124 thereof, the internal of the first light guide part 121, and then the second light guide part 123 through a reflection of the first reflective surface 121a of the first light guide part 121. In this embodiment, the invisible light beams L1, after being reflected by the first reflective surface 121a, is emitted out from the first light guide part 121 through the light-emission surface 121b thereof.

Through disposing these first light sources 130 under the two adjacent sides of the first light guide part 121, the invisible light beams L1 can corporately form a light net above the touch region 125 while being reflected to the second light guide parts 123 from the first reflective surfaces 121a. Furthermore, to make these invisible light beams L1 locate on a same horizontal plane while being emitted above the touch region 125, in this embodiment, the first reflective surface 121a of the first light guide part 121 and the first surface 122 of the transparent part 120a are configured to have an angle of 45 degrees therebetween, due to these invisible light beams L1 being emitted vertically into the first light guide part 121 through the bottom surface thereof; wherein the light-emission surface 121b is perpendicular to the first surface 122.

After being emitted through the above of the touch region 125 and then emitted into the second light guide part 123, the invisible light beams L1 are reflected to the light sensor 140 by the second reflective surface 123a of the second light guide part 123. And thus, the light sensor 140 can determine, according to the variations of light intensity of the received invisible light beams L1, whether or not the light net formed above the touch region 125 is blocked by an object touching the first surface 122. In this embodiment, the invisible light beams L1 are emitted into the internal of the second light guide part 123 through the light-incidence surface 123b and then reflected by the second reflective surface 123a of the second light guide part 123. Still, to make the invisible light beams L1 so that it can be precisely emitted to the light sensor 140, in this embodiment, the second reflective surface 123a of the second light guide part 123 and the first surface 122 of the transparent part 120a are configured to have an angle of 45 degrees therebetween; wherein the light-incidence surface 123b is perpendicular to the first surface 122.

In this embodiment, it is to be noted that the first light sources 130 each are corresponding to one light sensor 140. In other words, because the invisible light beams L1 emitted from each first light source 130 are guaranteed to be sensed by its corresponding light sensor 140, the touched point of an object on the first surface 122 can be determined according to the variations of the light intensity of the invisible light beams L1 received by the light sensors 140. However, it is understood that the present disclosure does not limit the first light sources 130 and the light sensors 140 to having a one-to-one correspondence; in other words, the number of the first light source 130 can be less than that of the light sensor 140 as found in another embodiment if the first light source 130 has a sufficient divergence angle; accordingly, the associated touch display device can have a lower cost.

In addition, although in this embodiment the first light guide part 121 and the second light guide 123 each are exemplified by having a protruding strip structure, it is understood that the present disclosure does not limit the structure of the first light guide part 121 and the second light guide 123. In another embodiment, the first light guide part 121 and the second light guide 123 each may be a plurality of discontinuous protruding blocks disposed at the four sides of the transparent part 120a; wherein the first light guide parts 121 (or, these protruding blocks) and the first light sources 120 are configured to have a one-to-one correspondence, and the second light guide parts 123 (or, these protruding blocks) and the light sensors 140 are configured to have a one-to-one correspondence.

The second light sources 150 are disposed beside the side surface 126 of the touch panel 120 and each configured to emit the visible light beams L2. Specifically, after being emitted into the internal of the touch panel 120 through the side surface 126 thereof, the visible light beams L2 are emitted out from the touch panel 120 through the first surface 122 thereof. In this embodiment, the display panel 110 is, for example, a reflective display panel which uses front light for the increase of the display brightness of the touch display device 100. In other words, the touch display device 100 in this embodiment can have front light through disposing a plurality of second light sources 150 beside the side surface 126 of the touch panel 120 so as to emit light in front of the display panel 120. In addition, the second light sources 150 each are a light emitting diode (LED), and no limitations.

To increase the light usage efficiency of the visible light beams L2 of the second light source 150, it is to be noted that the touch panel 120 in this embodiment may further include a plurality of micro-structures 127, which are distributed on the second surface 124 and/or the first surface 122 of the touch panel 120. The micro-structures 127 are configured to deflect the traveling direction of the visible light beams L2 in the internal of the touch panel 120; and thus, the visible light beams L2 can be prevented from having total reflection and consequently can be successfully emitted out from the first surface 122. After being emitted out from the first surface 122, the visible light beams L2 firstly are converted into an image through the pixel structure of the display panel 110 and then emitted into a user's eyes. As illustrated in FIG. 1B, it is understood that the micro-structures 127 distributed on the second surface 124 and the first surface 122 of the touch panel 120 are only used for an exemplification; in other words, the number, position, structure and arrangement of the micro-structures 127 can be adjusted based on actual requirements.

Figure 2:
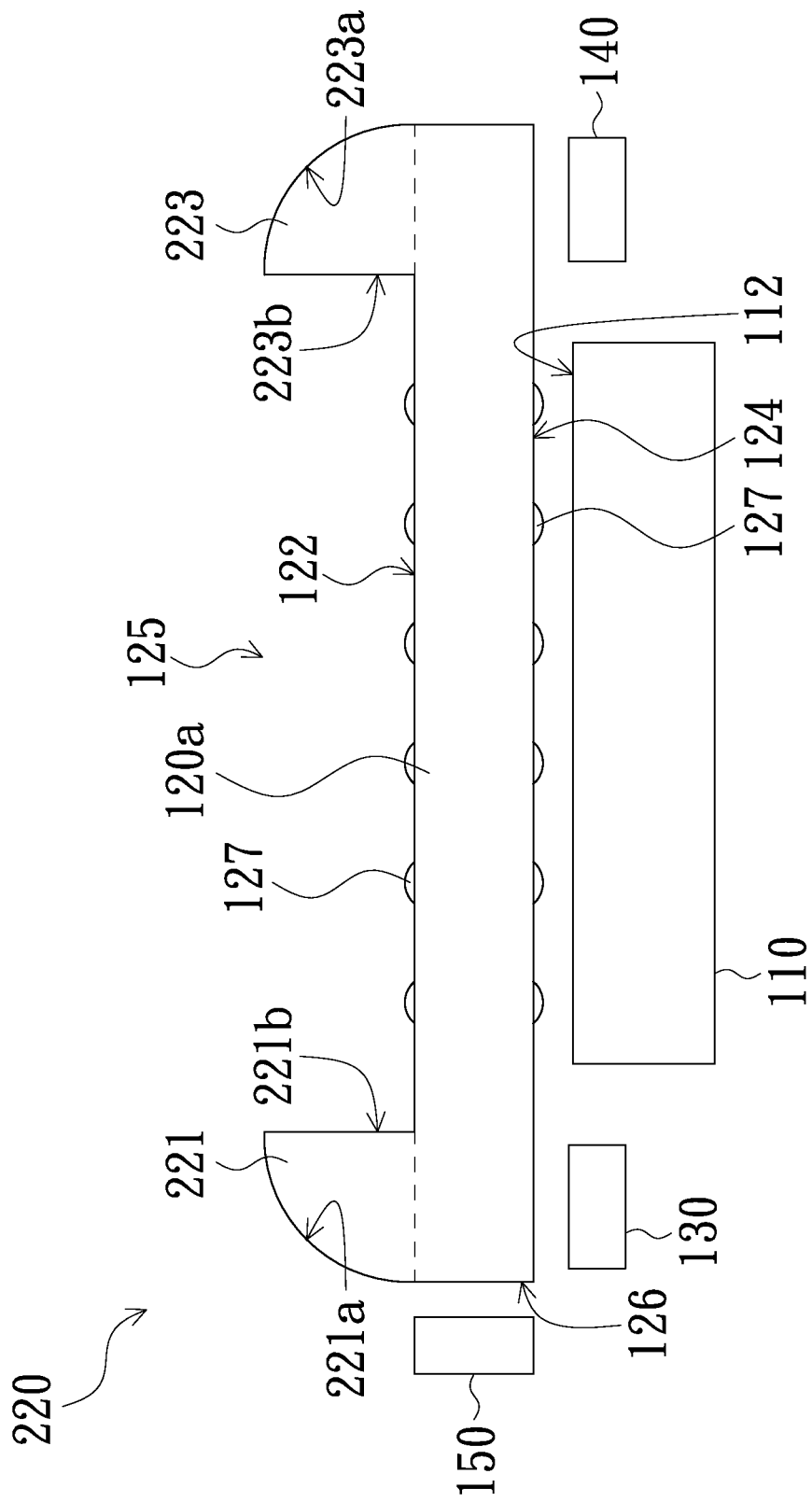
FIG. 2 is a schematic cross-sectional view of a touch display device in accordance with another embodiment of the present disclosure.

Particularly, in the touch panel 220 adopted in a touch display device in accordance with another embodiment of the present disclosure as illustrated in FIG. 2, the first reflective surface 221a of the first light guide part 221 and the second reflective surface 223a of the second light guide part 223 each can be configured to be a curved surface, and thereby increasing the light usage efficiency of the invisible light beams L1. Although in this embodiment, the first reflective surface 221a and the second reflective surface 223a both are exemplified by being a curved surface, it is understood that the invisible light beams L1 still can have a higher light usage efficiency if only one of the first reflective surface 221a and the second reflective surface 223a is a curved surface.

It is to be noted that the curved surface herein is not restricted to a continuous curved surface or a discontinuous curved surface. In other words, the first reflective surface 221a (or, the second reflective surface 223a) is indicated as being a continuous curved surface if having a curved structure thereon completely; alternatively, the first reflective surface 221a (or, the second reflective surface 223a) is indicated as being a discontinuous curved surface if having a curved structure thereon at only the portion above the first light source 130 (or the light sensor 140).

Figure 3:
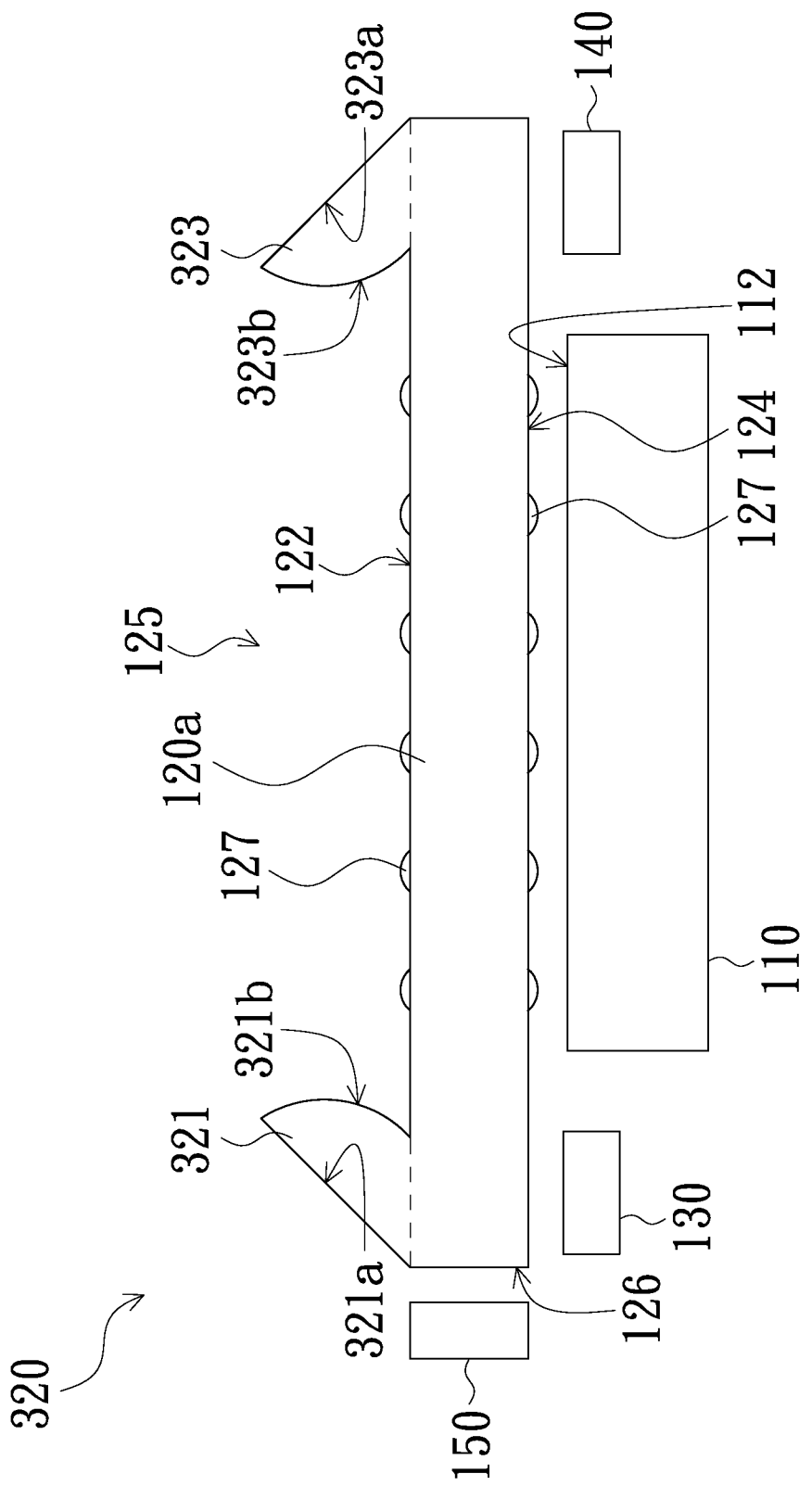
FIG. 3 is a schematic cross-sectional view of a touch display device in accordance with another embodiment of the present disclosure.

FIG. 3 is a schematic cross-sectional view of a touch display device in accordance with another embodiment of the present disclosure. As shown, in the touch panel 320, the light-emission surface 321b of the first light guide part 321 and the light-incidence surface 323b of the second light guide part 323 both are a curved surface (for example, a convex surface); and thus, the invisible light beams L1 can be collimated and consequently the light usage efficiency of the invisible light beams L1 light can be further improved.

Figure 4A:
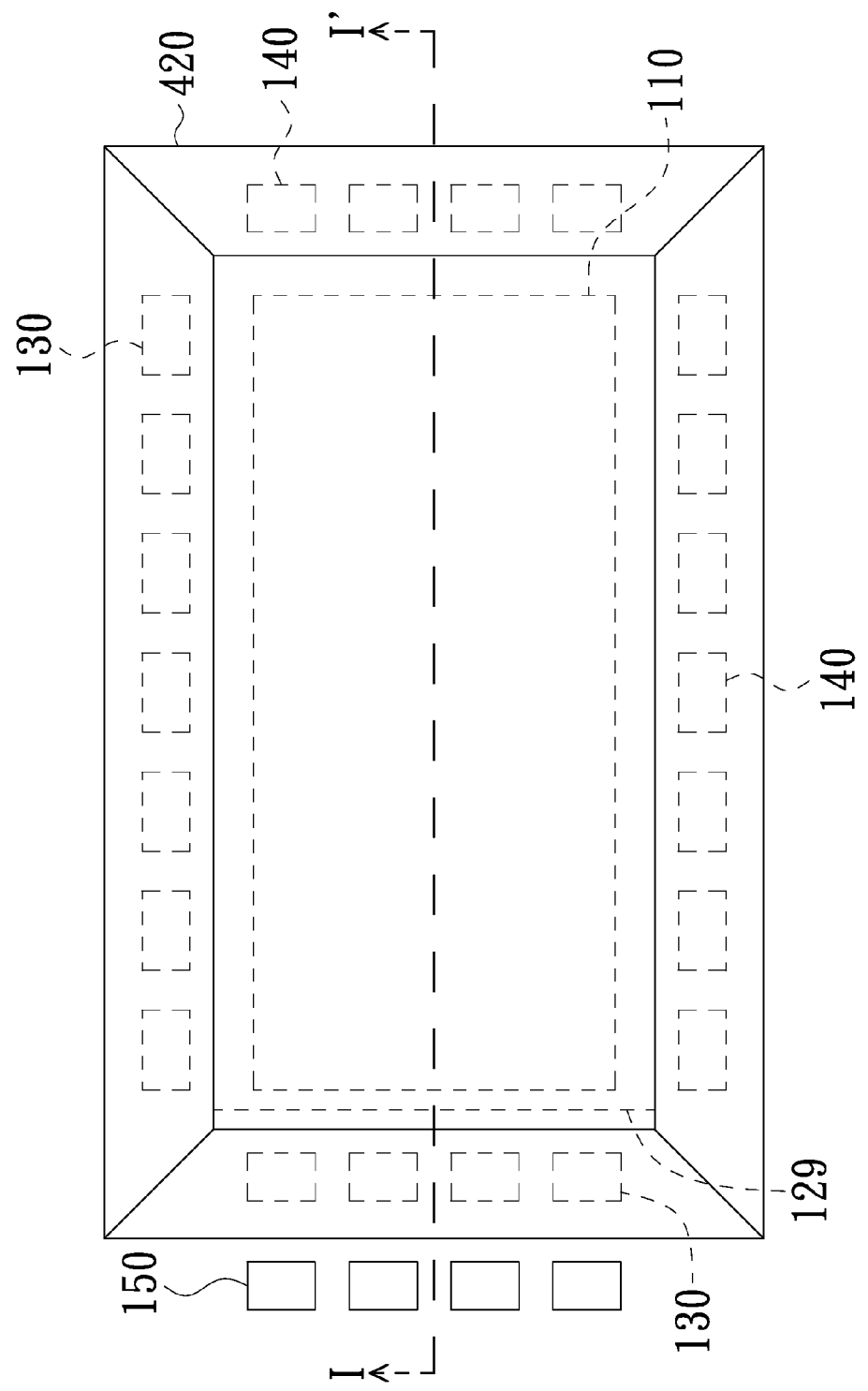
FIG. 4A is a schematic front view of a touch display device in accordance with another embodiment of the present disclosure.
Figure 4B:
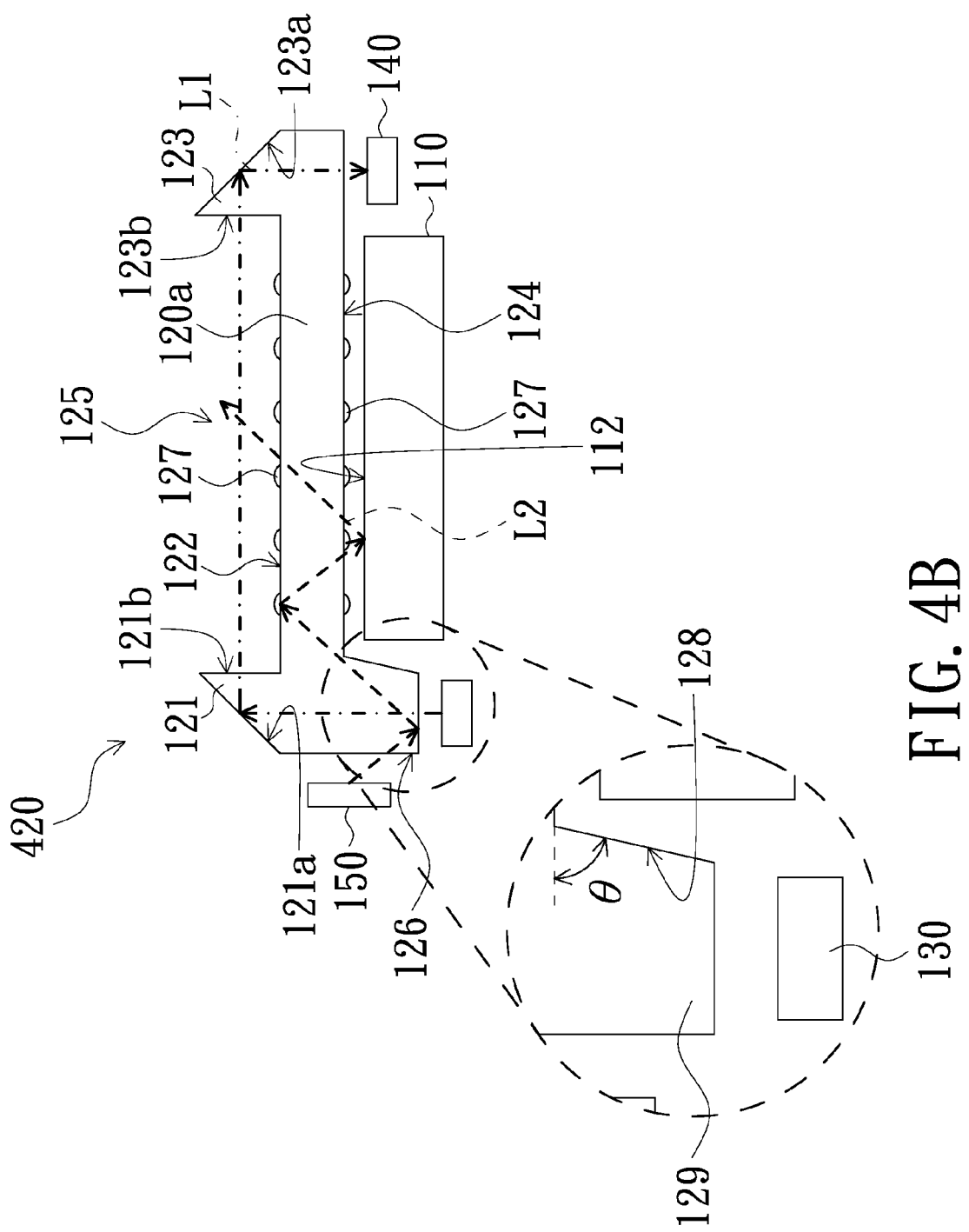
FIG. 4B is a schematic cross-sectional view of the touch display device in FIG. 4A along a line I-I'.

FIG. 4A is a schematic front view of a touch display device in accordance with another embodiment of the present disclosure; and FIG. 4B is a schematic cross-sectional view of the touch display device in FIG. 4A along a line I-I'. Please refer to FIGS. 4A, 4B both. The touch panel 420 adopted in the touch display device in this embodiment further includes at least one third light guide part 129, which is configured to protrude from the second surface 124 and is disposed on the side area of the transparent part 120a close to the second light source 150. Because the third light guide part 129 is disposed on the side area of the transparent part 120a, the side surface 126 can have a larger surface area; and thus, the touch panel 420 can have a larger-sized side surface 126 which is qualified to the light-emission angle of the LED if the second light source 150 is an LED having a size larger than the averaged thickness of the touch panel 420.

Particularly, in order to avoid the visible light beams L2 of the second light source 150 directly being emitted toward the display panel 110 from the third light guide part 129 and thereby resulting in a light leakage, the third light guide part 129 in this embodiment is configured to have a total-reflection surface 128; and the angle θ between the total-reflection surface 128 and the second surface 124 satisfies the equation:

$$\theta < (45° - \sin^{-1}(1/n)) \quad (1)$$

where n is the light refractive index of the touch panel 420.

As a result, the visible light beams L2 in the internal of the third light guide part 129 will, while being emitted on the total-reflection surface 128, be reflected back to the internal of the third light guide part 129; and consequently the visible light beams L2 can be prevented from leaking out from the third light guide part 129.

Figure 5A:
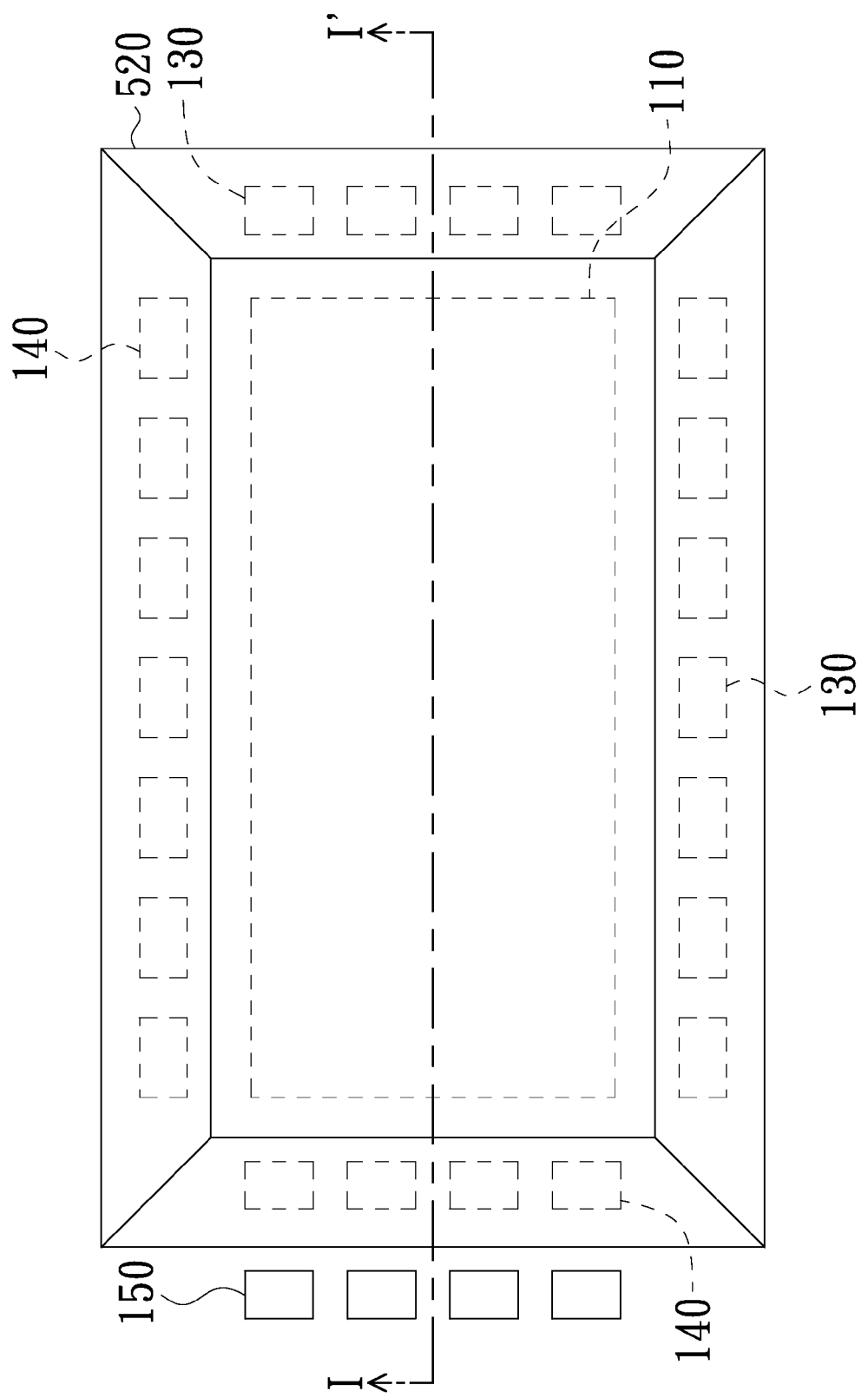
FIG. 5A is a schematic front view of a touch display device in accordance with another embodiment of the present disclosure.
Figure 5B:
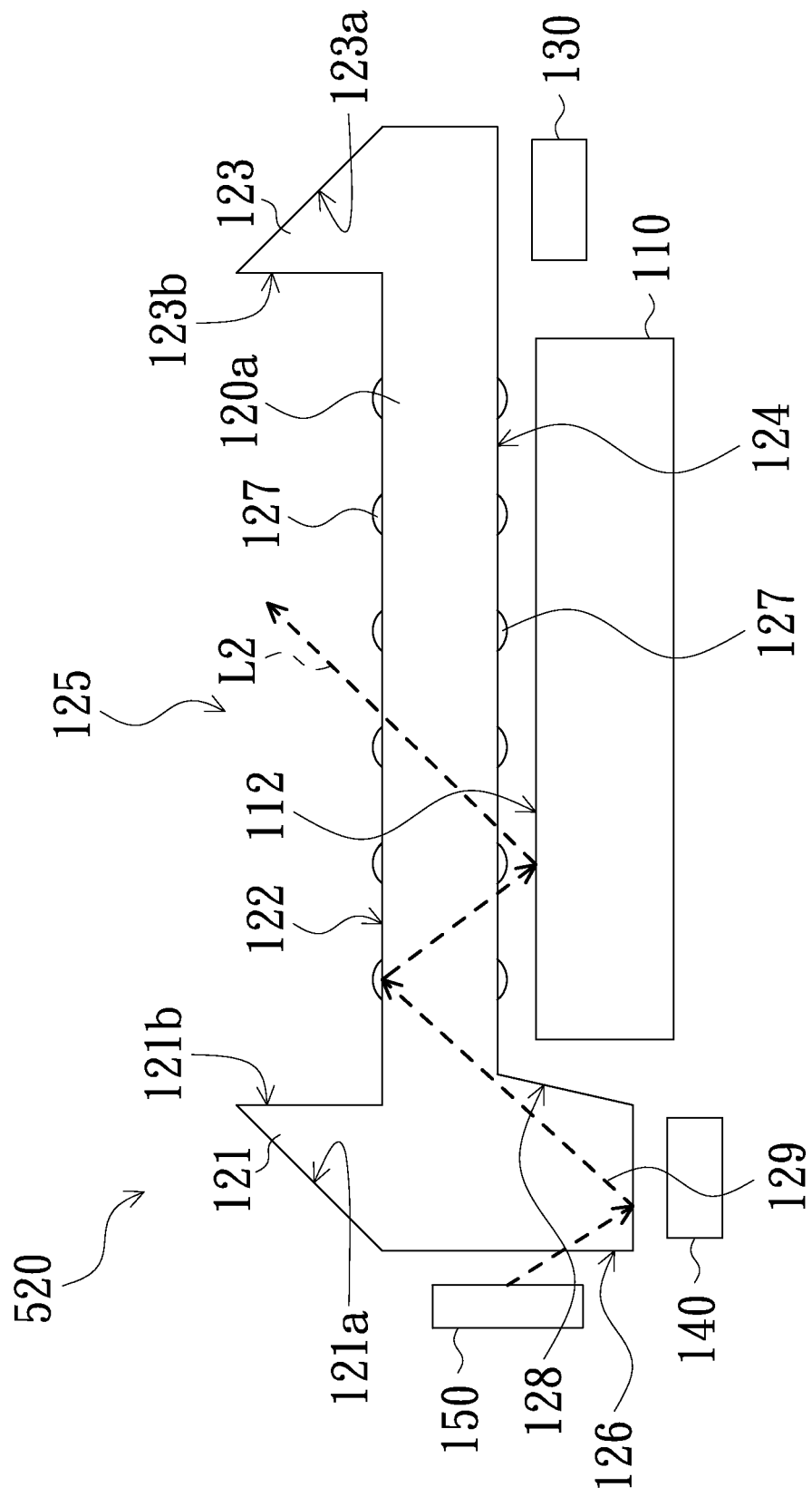
FIG. 5B is a schematic cross-sectional view of the touch display device in FIG. 5A along a line I-I'.

It is to be noted that the present disclosure does not limit that the first light source 130 and the second light source 150 are located at a same side of the touch panel 420. In other words, as illustrated in FIGS. 5A, 5B which are a schematic front view of a touch display device in accordance with another embodiment of the present disclosure and a schematic cross-sectional view of the touch display device in FIG. 5A along a line I-I', respectively, the second light source 150 can be disposed at a side of the touch panel 520 adjacent (or, opposite) to the side where the first light source 130 is disposed.

Please refer back to FIGS. 4A, 4B. Although the touch panel 420 is disposed with one second light source 150 at one side thereof, it is understood that the present disclosure does not limit the number of the second light source 150. In other words, two or more sides of the touch panel 420 each can be disposed with the second light source 150 in another embodiment; and thus, the associated touch display device can have a higher display brightness. In addition, as shown in FIGS.

4A, 4B, it is understood that the number and position of the third light guide part 129 in the touch panel 420 can be adjusted according to the number and position of the second light source 150 so as to make each second light source 150 can be disposed next to the third light guide part 129.

Figure 6A:
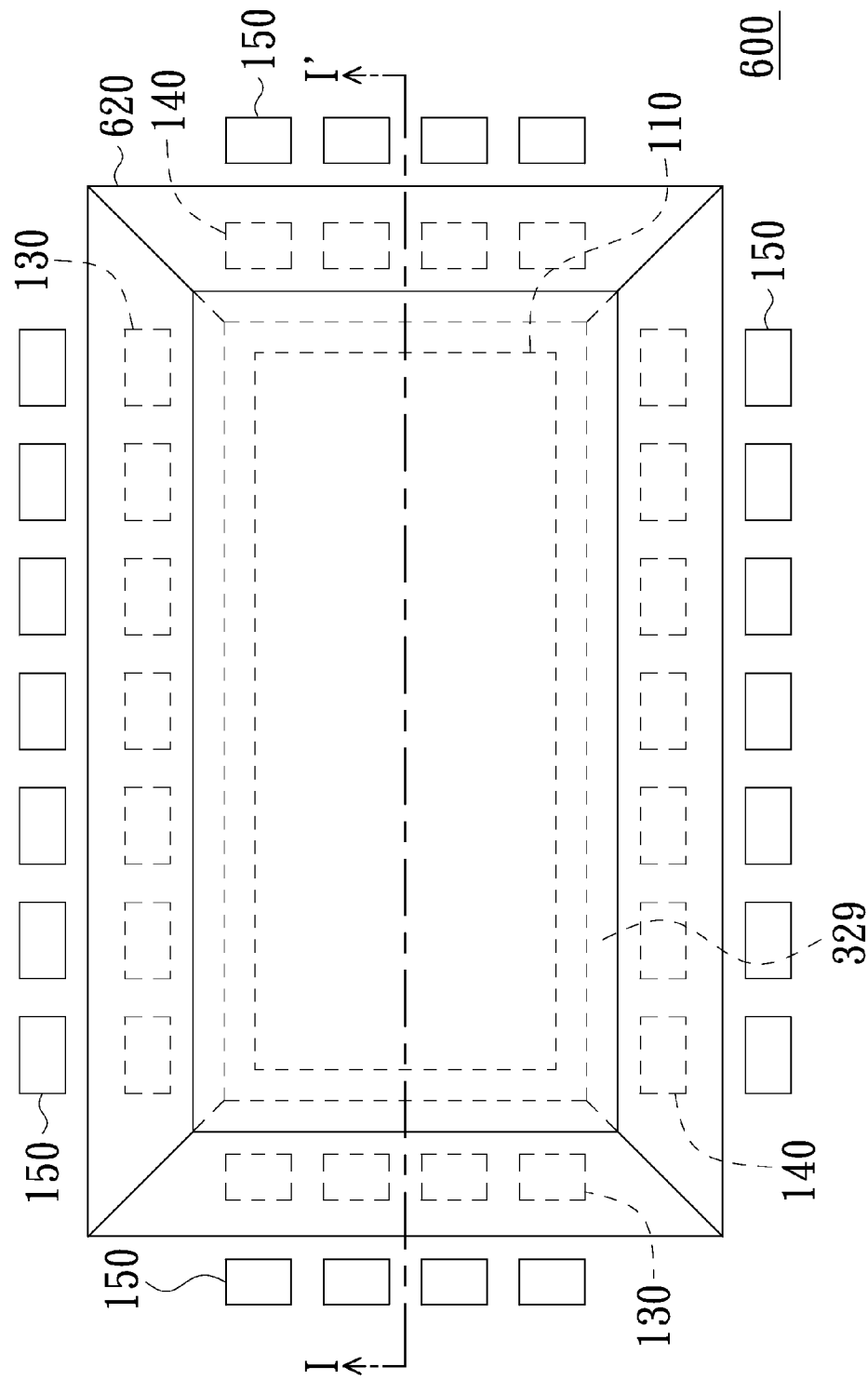
FIG. 6A is a schematic front view of a touch display device in accordance with another embodiment of the present disclosure.
Figure 6B:
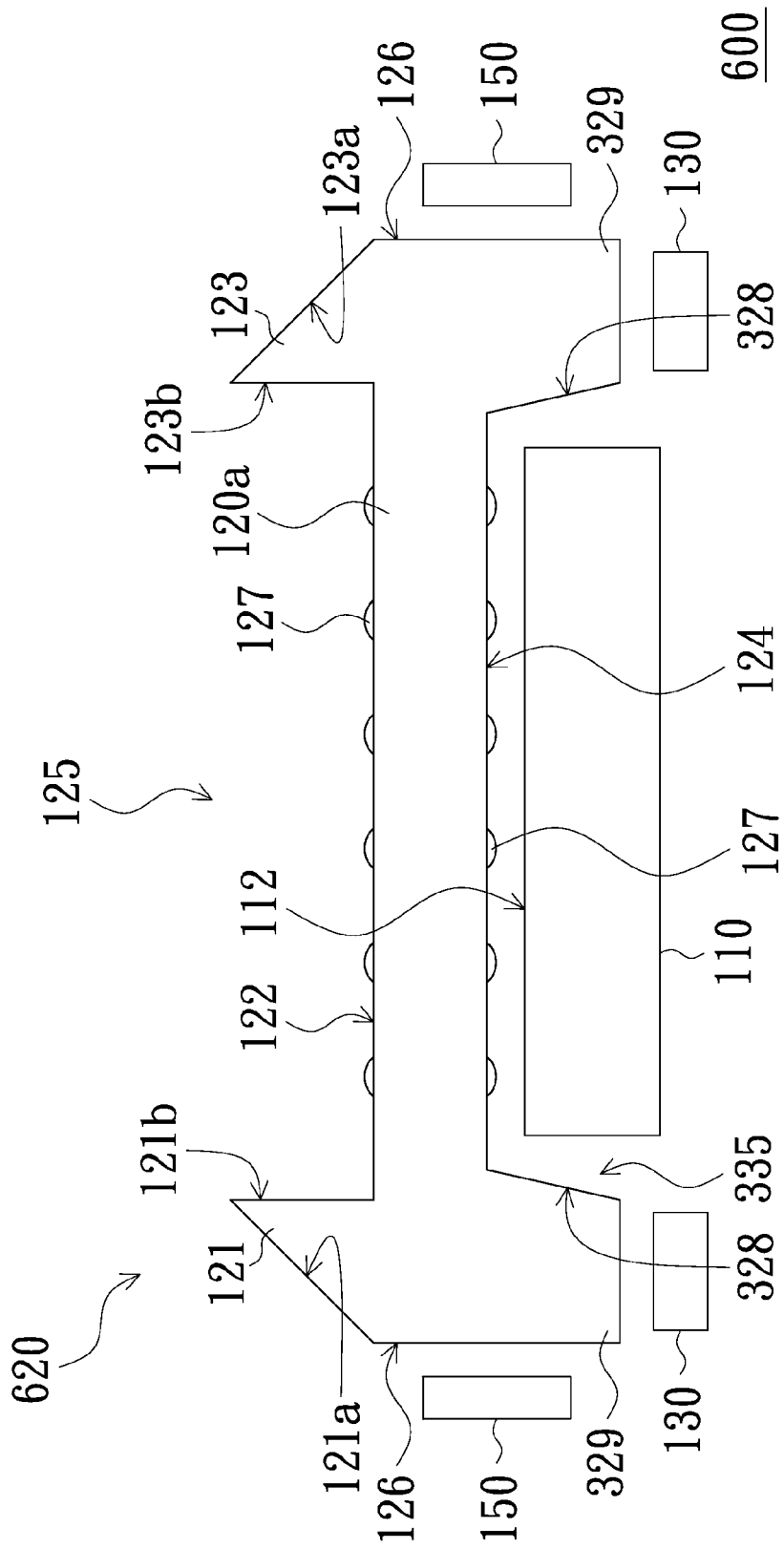
FIG. 6B is a schematic cross-sectional view of the touch display device in FIG. 6A along a line I-I'.

FIG. 6A is a schematic front view of a touch display device in accordance with another embodiment of the present disclosure; and FIG. 6B is a schematic cross-sectional view of the touch display device in FIG. 6A along a line I-I'. Please refer to FIGS. 6A, 6B both. In the touch display device 600 in this embodiment, the touch panel 620 further includes an annular light guide part 329 in response to the second light sources 150 being disposed at the four sides of the touch panel 620. In particular, the annular light guide part 329 is configured to protrude from the second surface 124 and corporately with the second surface 124 form an accommodation space 335, in which the display panel 110 is disposed. In this embodiment, the annular light guide part 329 has an annular total-reflection surface 328; still, the angle θ between the annular full-reflection surface 328 and the second surface 124 satisfies the equation (1), and accordingly the visible light beams L2 emitted from the second light source 150 can be prevented from leaking from the annular light guide part 329.

The first light guide part and the second light guide part in each of the aforementioned embodiments are exemplified to have a same structure; however, it is to be noted that the first light guide part and the second light guide part in the present disclosure are not necessary to have a same structure. The following is another embodiment of the present disclosure.

Figure 7:
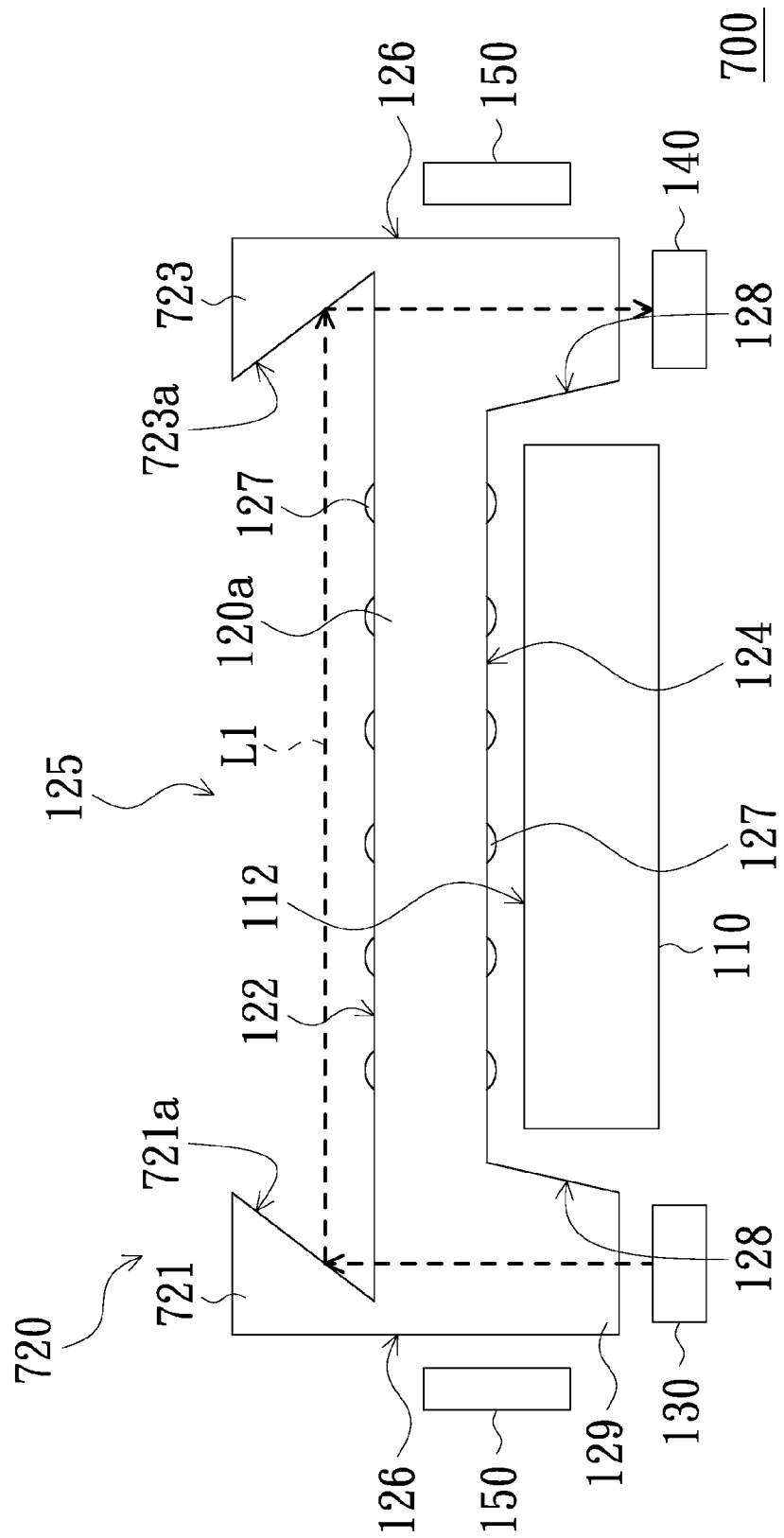
FIG. 7 is a schematic cross-sectional view of a touch display device in accordance with another embodiment of the present disclosure.

FIG. 7 is a schematic cross-sectional view of a touch display device in accordance with another embodiment of the present disclosure. As shown, the touch display device 700 in this embodiment is similar to the touch display device in each of the aforementioned embodiments. Specifically, it is understood that the same symbol or label in FIG. 7 and aforementioned embodiments represents a same or a similar device embodiment. Therefore, the following description will be only focused on the differences between this embodiment and the aforementioned embodiments.

As illustrated in FIG. 7, the first reflective surface 721a of the first light guide part 721 and the second reflective surface 723a of the second light guide part 723 of the touch panel 720 both are configured to directly face the touch region 125; and thus, the invisible light beams L1 of the first light source 130 can be directed to the light sensor 140 sequentially by the reflections of the first reflective surface 721a and the second reflective surface 723a without being emitted into the internals of the first light guide part 721 and the second light guide part 723.

It is to be noted that the first light guide part 721 and the second light guide part 723 shown in FIG. 7 can also be applied in any aforementioned embodiments. In other words, it is understood that the aforementioned various embodiments of the present disclosure each can have a reasonable combination/modulation based on other embodiments, and no unnecessary details will be further elaborated.

In summary, because the touch panel adopted in the touch display device of the present disclosure has one or more light guide parts, the invisible light beams emitted from the first light source can corporately form a light net above a touch region on the touch panel while being directed to the light sensors by the light guide parts of the touch panel. Thus, a portion of the light net will be blocked while the first surface of the transparent part of the touch panel is being touched by an object; and consequently the position of the object touch on the touch panel can be determined based on the variations of the light intensity received by the light sensors.

In addition, the touch display device of the present disclosure further includes the second light source configured to emit visible light beams so as to improve the display brightness of the touch display device; wherein the touch panel with the light guide parts can also function as a light guide plate for the second light source. And thus, the touch display device of the present disclosure can use less number of elements and consequently has a smaller size and a lower cost.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A touch display device, comprising:
a display panel having a display surface;
a touch panel disposed above the display panel and comprising:
a transparent part having a first surface, a second surface and at least one side surface, wherein the first surface and the second surface are opposite to each other, the second surface is configured to face the display surface, the at least one side surface is connected between the first surface and the second surface;
a plurality of first light guide parts configured to protrude from the first surface and disposed at two adjacent sides of the transparent part, wherein each first light guide part has a first reflective surface;
a plurality of second light guide parts configured to protrude from the first surface and disposed at another two adjacent sides of the transparent part, wherein the second light guide parts and the first light guide parts corporately defines a touch region on the first surface, each second light guide part has a second reflective surface, the first reflective surfaces and the second reflective surfaces each are configured to face the touch region; and
at least one third light guide part configured to protrude from the second surface and disposed at one side of the transparent part so as to be close to the at least one second light source wherein the at least one third light guide part has a total-reflection surface, the total-reflection surface and the transparent part are configured to have an angle θ therebetween, the angle θ satisfies an equation of $\theta < (45° - \sin^{-1}(1/n))$, wherein n is the light refractive index of the touch panel;
a plurality of first light sources disposed under the touch panel and corresponding to the first light guide parts and each configured to emit invisible light beams, the invisible light beams are emitted into the touch panel through the second surface, the first surfaces each are configured to reflect the invisible light beams thereby reflecting the invisible light beams sequentially above the touch region and to the corresponding second reflective surface;
a plurality of light sensors disposed under the touch panel and corresponding to the second light guide parts and each configured to receive the invisible light beams reflected by the corresponding second reflective surfaces; and
at least one second light source disposed beside the at least one side surface and configured to emit visible light beams, wherein the visible light beams are emitted into the touch panel through the at least one side surface.

2. The touch display device according to claim 1, wherein the touch panel comprises a plurality of micro-structures distributed on at least one of the first surface and the second surface.

3. The touch display device according to claim 1, wherein the at least one second light source and the first light sources are disposed at a same side of the touch panel.

4. The touch display device according to claim 1, wherein the at least one second light source and the light sensors are disposed at a same side of the touch panel.

5. The touch display device according to claim 1, wherein the first reflective surface and the first surface are configured to have an angle of 45 degrees therebetween, the second reflective surface and the first surface are configured to have an angle of 45 degrees therebetween.

6. The touch display device according to claim 1, wherein at least one of the first reflective surface and the second reflective surface is a curved surface.

7. The touch display device according to claim 1, wherein the first light guide parts each further have a light-emission surface, and the invisible light beams, after being reflected by the first reflective surfaces, are emitted out from the first light guide parts through the light-emission surfaces.

8. The touch display device according to claim 7, wherein the light-emission surfaces each are a curved surface.

9. The touch display device according to claim 5, wherein the second light guide parts each further have a light-incident surface, the invisible light beams, after being emitted out from the light-emission surfaces, are emitted into the second light guide parts through the light-incident surfaces and then reflected to the light sensors by the second reflective surfaces.

10. The touch display device according to claim 9, wherein the light-incident surfaces each are a curved surface.

11. The touch display device according to claim 1, wherein the invisible light beams, after being reflected by the first reflective surfaces, are directly emitted to the second reflective surfaces.

12. The touch display device according to claim 1, wherein the display panel is a reflective display panel.

13. The touch display device according to claim 1, wherein the transparent part, the first light guide parts and the second light guide parts of the touch panel are configured to have a one-piece structure.

14. The touch display device according to claim 1, wherein the materials of the transparent part are different to that of the first and the second light guide parts.

15. A touch display device, comprising:
a display panel having a display surface;
a touch panel disposed above the display panel and comprising:
 a transparent part having a first surface, a second surface and at least one side surface, wherein the first surface and the second surface are opposite to each other, the second surface is configured to face the display surface, the at least one side surface is connected between the first surface and the second surface;
 a plurality of first light guide parts configured to protrude from the first surface and disposed at two adjacent sides of the transparent part, wherein each first light guide part has a first reflective surface;
 a plurality of second light guide parts configured to protrude from the first surface and disposed at another two adjacent sides of the transparent part, wherein the second light guide parts and the first light guide parts corporately defines a touch region on the first surface, each second light guide part has a second reflective surface, the first reflective surfaces and the second reflective surfaces each are configured to face the touch region; and
 an annular light guide part configured to protrude from the second surface, the annular light guide part and the transparent part corporately form an accommodation space, and the display panel is disposed in the accommodation space wherein the annular light guide part has an annular total-reflection surface, the annular total-reflection surface and the transparent part are configured to have an angle θ therebetween, the angle θ satisfies an equation of $\theta < (45° - \sin^{-1}(1/n))$,
wherein n is the light refractive index of the touch panel;
a plurality of first light sources disposed under the touch panel and corresponding to the first light guide parts and each configured to emit invisible light beams, the invisible light beams are emitted into the touch panel through the second surface, the first surfaces each are configured to reflect the invisible light beams thereby reflecting the invisible light beams sequentially above the touch region and to the corresponding second reflective surface;
a plurality of light sensors disposed under the touch panel and corresponding to the second light guide parts and each configured to receive the invisible light beams reflected by the corresponding second reflective surfaces; and
at least one second light source disposed beside the at least one side surface and configured to emit visible light beams, wherein the visible light beams are emitted into the touch panel through the at least one side surface.

* * * * *